(12) United States Patent
Allen (10) Patent No.: US 10,242,174 B2
(45) Date of Patent: *Mar. 26, 2019

(54) SECURE INFORMATION FLOW

(71) Applicant: Amazon Technologies, Inc., Seattle, WA (US)

(72) Inventor: Nicholas Alexander Allen, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

This patent is subject to a terminal disclaimer.

(21) Appl. No.: 14/617,691

(22) Filed: Feb. 9, 2015

(65) Prior Publication Data

US 2015/0178492 A1    Jun. 25, 2015

Related U.S. Application Data

(63) Continuation of application No. 13/795,530, filed on Mar. 12, 2013, now Pat. No. 8,955,155.

(51) Int. Cl.
*G06F 21/44* (2013.01)
*G06F 21/62* (2013.01)

(52) U.S. Cl.
CPC .......... *G06F 21/44* (2013.01); *G06F 21/6209* (2013.01)

(58) Field of Classification Search
CPC .............. G06F 17/30; G06F 17/30091; G06F 17/30115; G06N 5/04; G06N 5/048
USPC .......................................................... 726/29
See application file for complete search history.

(56) References Cited

U.S. PATENT DOCUMENTS

| | | | |
|---|---|---|---|
| 7,340,469 B1 | 3/2008 | Alghathbar et al. | |
| 7,512,792 B2 | 3/2009 | Arroyo et al. | |
| 7,761,465 B1 * | 7/2010 | Nonaka ................... | G06F 21/10 707/770 |
| 7,793,100 B2 | 9/2010 | Arroyo et al. | |
| 8,024,565 B2 | 9/2011 | Arroyo et al. | |
| 8,091,128 B2 | 1/2012 | Yu | |
| 8,266,702 B2 | 9/2012 | Naldurg et al. | |

(Continued)

FOREIGN PATENT DOCUMENTS

| | | |
|---|---|---|
| EP | 1917765 | 5/2008 |
| EP | 2062187 | 5/2009 |

(Continued)

OTHER PUBLICATIONS

"What is the Windows Integrity Mechanism" Downloaded Mar. 7, 2013 from http://msdn.microsoft.com/en-us/library/bb625957.aspx pp. 1-4.

(Continued)

*Primary Examiner* — Joseph P Hirl
*Assistant Examiner* — Sayed Aresh Beheshti Shirazi
(74) *Attorney, Agent, or Firm* — Robert C. Kowert; Meyertons, Hood, Kivlin, Kowert & Goetzel, P.C.

(57) ABSTRACT

Secure information flow may include a service receiving a request for data from a caller. The service may respond to the request with the requested data via a secure flow container. The secure flow container may then send the information to the caller component. Before the secure flow container receives or sends the information, a monitoring environment may permit the secure flow container to receive or send the information, respectively.

19 Claims, 5 Drawing Sheets

(56) References Cited

U.S. PATENT DOCUMENTS

| | | | |
|---|---|---|---|
| 8,955,155 B1* | 2/2015 | Allen | G06F 21/44 380/201 |
| 2006/0143689 A1 | 6/2006 | Yu et al. | |
| 2007/0073624 A1* | 3/2007 | Ishibashi | G06F 21/10 705/53 |
| 2008/0172747 A1* | 7/2008 | Hurtado | G06Q 20/3829 726/26 |
| 2008/0310327 A1 | 12/2008 | Millen et al. | |
| 2010/0008500 A1 | 1/2010 | Lisanke et al. | |
| 2010/0049922 A1* | 2/2010 | Aronovich | G06F 9/524 711/147 |
| 2010/0058486 A1* | 3/2010 | Wilson | G06F 21/6218 726/28 |
| 2010/0281056 A1 | 11/2010 | Nonaka et al. | |
| 2012/0054744 A1 | 3/2012 | Singh et al. | |
| 2012/0096457 A1 | 4/2012 | Gupta et al. | |
| 2012/0258777 A1 | 10/2012 | Huang | |
| 2013/0036456 A1* | 2/2013 | Boysen | G06Q 20/04 726/4 |
| 2013/0191147 A1* | 7/2013 | Harrell | G06Q 40/00 705/2 |
| 2013/0312098 A1 | 11/2013 | Kapoor et al. | |
| 2014/0189777 A1* | 7/2014 | Viswanathan | H04L 63/105 726/1 |

FOREIGN PATENT DOCUMENTS

| | | |
|---|---|---|
| EP | 2385479 | 11/2011 |
| EP | 2509000 | 10/2012 |

OTHER PUBLICATIONS

Wikipedia "Information flow (information theory)" Downloaded Mar. 7, 2013 from http://en.wikipedia.org/wikilInformation_flow(information_theory) pp. 1-5.

* cited by examiner

SECURE INFORMATION FLOW

This application is a continuation of U.S. patent application Ser. No. 13/795,530, filed Mar. 12, 2013, now U.S. Pat. No. 8,955,155, which is hereby incorporated by reference in its entirety.

BACKGROUND

In a computer system, information flow may describe how components of a system may interact with each other. For example, when a file is retrieved, network messages are exchanged, or an object in memory is accessed, information may flow from one part of the system to another. However, most systems lack a way to enforce security policies on information flows. For instance, authorization for a client to access services controls access to whether that client can access data. But once the data is accessed, there is no control over what the client does with the data.

Specific embodiments are shown by way of example in the drawings and will be described herein in detail. It should be understood, however, that the drawings and detailed description are not intended to limit the claims to the particular embodiments disclosed, even where only a single embodiment is described with respect to a particular feature. On the contrary, the intent is to cover all modifications, equivalents and alternatives falling within the spirit and scope of the present disclosure as defined by the appended claims. Examples of features provided in the disclosure are intended to be illustrative rather than restrictive unless stated otherwise.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a computer system may be configured to perform operations even when the operations are not currently being performed). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of secure information flow are disclosed. Various ones of the present embodiments include a service for receiving a request for data from a caller. Based, at least in part, on one or more permissions, the service may respond to the request with the requested data via a secure flow container. The secure flow container may then provide the requested data to the caller. In various embodiments, a monitoring environment may determine that the secure flow container is permitted to receive the requested data from the service and to provide the requested data to the caller. In some embodiments, the virtual secure flow container may declassify the requested data such that the caller has the ability to access the requested data. Various examples and embodiments are described herein.

The specification first describes a system configured to implement secure information flow, followed by a block diagram of example secure information flow, followed by flowcharts of various embodiments of a method for secure information flow. The specification then describes an example system that may implement the disclosed secure information flow. Various examples are provided throughout the specification.

Figure 1:
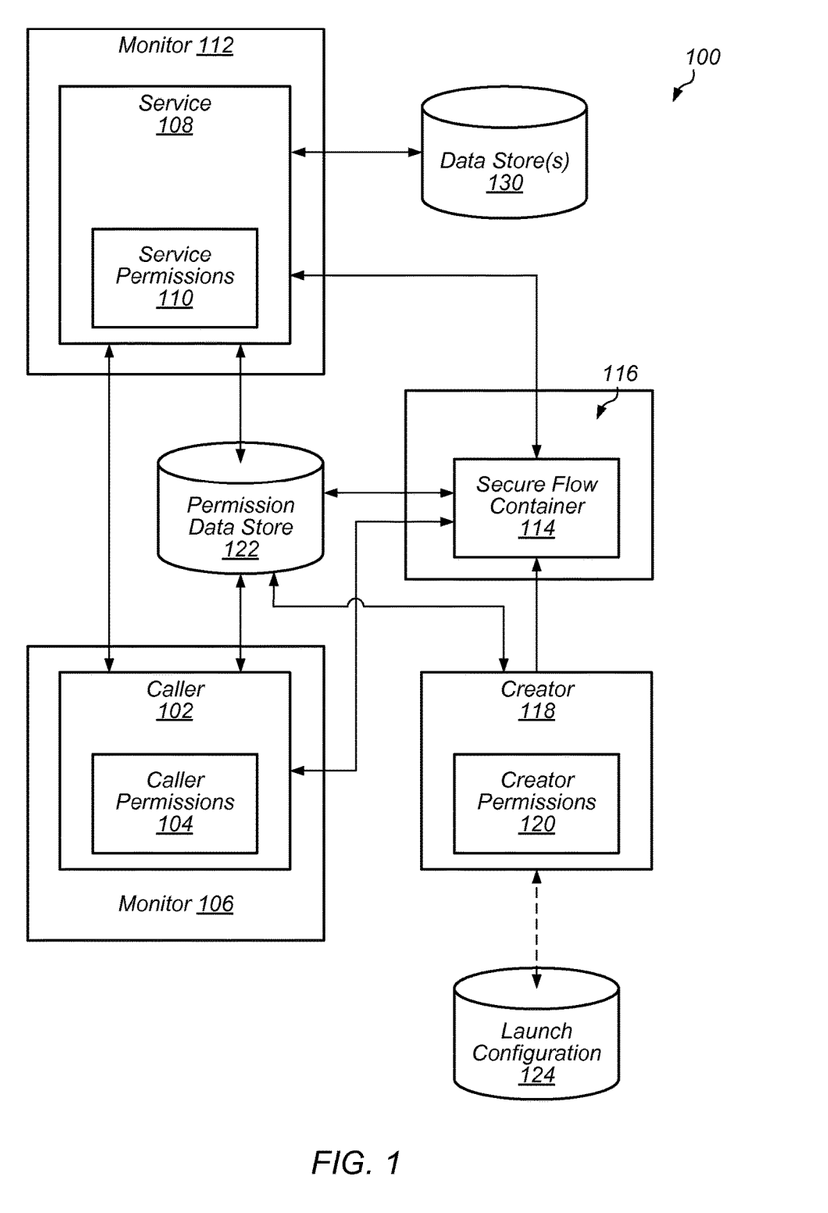
FIG. 1 illustrates a block diagram of a system for secure information flow enforcement, according to some embodiments.

Turning now to FIG. 1, an example system 100 that may provide for secure enforcement of information flow is shown. For example, system 100 may provide a mechanism in which to return data to the caller. In the illustrated embodiment, system 100 includes caller 102, service 108, secure flow container ("SFC") 114, creator 118, permission data store 122, launch configuration 124, and data store 130. In various embodiments, the various components of system 100, such as caller 102, service 108, secure flow container 114, creator 118, permission data store 122, launch configuration 124, and data store 130 may be implemented as a distributed computing system, on one or more computing devices (whether collocated or remote). As described herein, one or more of the components of system 100 may be implemented on virtual machines. Accordingly, system 100 may provide for enforcing information flow policy across component boundaries using virtualization.

In one embodiment, launch configuration 124 may be a data store that stores information about how to instantiate an SFC. The SFC may also be referred to as a return valve or virtual return point. Such information stored by launch configuration 124 may include the type of virtual machine to host the SFC, what type of software, what type of operations, etc. Launch configuration 124 may be configured with one or more application modules and at least one virtual environment specification for executing the application modules. An application module may include source code, binary executables, scripts, and/or other data operable to process information flows produced by the application. A virtual environment specification may include descriptions of how to create or provision private copies of resources, such as virtual machines, storage spaces, databases, and/or other computing resources, used by the application modules.

In one embodiment, permission data store 122 may be configured to store a mapping between application-defined permissions and owners of those permissions. As an example, permission data store 122 may be a secure label metadata store that stores a mapping between application-defined labels and label owners. Labels may be created by an application or system provided function that assigns ownership of the label to the creator. A label may be represented by a globally unique identifier (GUID) generated by the secure label metadata store or may have one or more alias names as defined by creator 118. The labels may also be associated with pieces of information. Thus, a label may be represented by a GUID, an owner, and one or more pieces of information. Although reference to labels is used throughout the specification, in other embodiments, other permission models may be used instead of or in addition to labels.

Permission data store 122 may support delegation of permissions, assignment of ownership, renaming, deletion, and/or other management functions for the labels. Various permissions may exist, such as read, write, forward, and/or modify. Access is used herein to refer to the ability of an entity to read a piece/block of data and integrity is used herein to refer to the ability of an entity to forward, write, and/or modify a piece of data. In one embodiment, the data to which the permissions pertain may be stored in one or more data stores 130, or in some other backend resource, such as another service. As an example of the various permissions, if service 108 has access permission for pieces of data A, B, and C, then service 108 may read pieces of data A, B, and C. If service 108 has integrity permission for piece of data E, then service 108 may forward piece of data E to another component, such as caller 102 via secure flow container 114. Then, if caller 102 has permission to read piece of data E, it may do so.

In the label store example for permission data store 122, the label store may include access labels and integrity labels. In some embodiments, information may be permitted to flow from a sender A to a recipient B if, for each access label L1 on the data sent by sender A, at least one of the following is true: (1) recipient B is the owner of label L1, (2) recipient B has permission for label L1; or (3) sender A is the owner of label L1.

In some embodiments, information may be permitted to flow from a sender A to a recipient B if, for each integrity label L2 on the receiving process recipient B, at least one of the following is true: (1) sender A is the owner of label L2, (2) sender A has permission for label L2, or (3) recipient B is the owner of label L2.

The label flow requirements may act in a transitive manner such that if A may flow a message to B and B may flow a message to C, then A may also directly flow the message to C. Thus, as described herein, where a sender sends data to a recipient, there may be any number of proxies, intermediaries, and/or other participants not mentioned along the indicated flow path configured with appropriate permissions.

Monitors 106, 112, and 116 may be configured to enforce information flow between various components of the system. For example, the monitors may be configured to monitor information flow between caller 102 and service 108, service 108 and secure flow container 114, and secure flow contain 114 and caller 102. In various embodiments, caller 102, service 108, secure flow container 114, and/or creator 118 may be implemented as virtual machines. In one embodiment, the monitors may be virtual machine hypervisors that intercept inputs and outputs from the respective virtual machine implementing that system component to enforce information flows. In other embodiments, the monitors may be a paravirtual operation system that intercepts inputs and outputs from an operating system process to enforce information flows. In one embodiment, the monitors may not actually be separate monitors as shown. Instead, the monitors may be a single system environment configured to validate/authorize ingress/egress of the traffic between system components. Validating/authorizing the traffic between components may include intercepting communications between the machines and determining which communications to allow/deny. Determining which communications to allow/deny may include determining if a communication is permitted according to the permissions for the entity receiving and/or transmitting the communication.

Caller 102 and service 108 may be two entities that wish to exchange data/messages in some manner. As a simple example of the flow between caller 102 and service 108, caller 102 may request data from service 108 (e.g., that is stored in data store 130). Service 108 may send the requested data to caller 102 via secure flow container 114. Note that use of the term caller and service may refer to which component of the distributed computing system is requesting data and which is providing data in response to the request. In some embodiments, a component that is a caller at one time may be a service at another time. Similarly, a component that is a service at one time may be a caller at another time. Accordingly, each of caller 102 and service 108 may be configured to operate as either a caller or service. For simplicity, however, the specification will describe caller 102 in terms of a caller and service 108 in terms of a service.

Creator 118 may be the entity that has control over the data that can be returned by service 108. Control may include the ability to make a declassification decision for a particular piece of information. In one embodiment, the creator may be an administrator. In another embodiment, the creator is not an administrator but simply has control over the data. Note that multiple creators may exist based on whatever information is in the system.

Creator 118 may access launch configuration 124 and/or permission data store 122 to create secure flow container 114 and/or a master secure flow container from which secure flow container 114 may be derived. Creator 118 may register the SFC with a set of permissions (e.g., creator permissions) drawn from permission data store 122. The set of creator permissions may then be associated with the SFC. For example, creator 118 may specify a creator permission to declassify a piece of information and provide the system with a description to instantiate an SFC to process declassification requests (e.g., by caller 102).

As a simple example regarding financial information, creator 118 may be the representative of the finance department of a company who owns/creates the data and/or has the ability to declassify the data. Service 108 may be the entity that has the ability to read and/or access the information/data (e.g., from data store 130). In one embodiment, however, service 108 may not have permission to transmit the information/data to any location it wants to. In such an example, the service may have access permissions but not propagate/write permissions. Service 108 may, however, use secure flow container 114 as a return route to provide the data to caller 102.

Secure flow container 114 may be the return path for communications between two components of system 100, such as caller 102 and service 108. SFC 114 may be created by creator or an instance of the SFC may be created by caller 102 (e.g., upon generating a request for information from service 108), or by service 108 to return requested information to caller 102. In various embodiments, an SFC may be created on demand, may be used for a single communication, and/or multiple communications. An SFC may persist indefinitely, for a particular amount of time, for a particular communication, etc.

Although the example of FIG. 1 illustrates a call going directly from caller 102 to service 108 and the return from service 108 to caller 102 going through secure flow container 114, in other embodiments, the call from caller 102 to service 108 may also go through a secure flow container (e.g., secure flow container 114 or another SFC). In embodiments in which a call from caller 102 to service 108 goes through an SFC, the return from service 108 to caller 102 may or may not also go through an SFC.

Caller 102, service 108, and creator 118 may each be associated with a set of permissions (e.g., caller permissions 104, service permissions 110, and creator permissions 120, respectively). The permissions may define relationships between various pieces of data, owners of the pieces of data, and/or the abilities (e.g., access, integrity, etc.) of other entities with respect to those pieces of data. As described herein, permission data store 122 may store permissions of the caller, service, creator, etc. In one embodiment, the individual permissions (e.g., caller permissions 104, service permissions 110, and creator permissions 120) may be stored locally at the respective entity and in permission data store 122. The permissions stored locally at the caller, service, and/or creator may include different (e.g., additional and/or modified) permissions from those stored in permission data store 122. Caller 102, service 108, secure flow container 114, and creator 118 may each be configured to read, write, and/or modify permissions stored in permission data store 122 that are owned by that respective component. For example, if caller 102 owns data A, B, C, and D, then caller 102 may be able to modify permissions for data A, B, C, and D for caller 102 and/or other entities. In some embodiments, a component may modify a local permission owned by that component. For example, as described herein, caller 102 may create a token that includes a permission, held by the caller, to propagate to service 108. Or, caller 102 may update caller permissions 104 to reflect the modified permission. As another example, creator 118 may, in some embodiments, be configured to modify permissions for any one of the respective entities of system 100.

Although FIG. 1 illustrates one instance of each component, note that other instances of components may exist. For example, multiple instances of a caller component (e.g., representing different caller entities) may each request data from one or more instances of a service component. Additionally, multiple secure flow containers may exist. For example, an SFC may be a single use SFC that is only used with one particular caller instance and one particular service instance. In such an example, for other caller-service combinations, a different SFC may be created. In another example, a single SFC may be used across multiple requests for data, such as a caller requesting data from a single service instance or multiple service instances. In such an example, the SFC may persist and be reused between different caller-service combinations. In one embodiment, a given SFC may be created for and correspond to a particular set of data.

Figure 2:
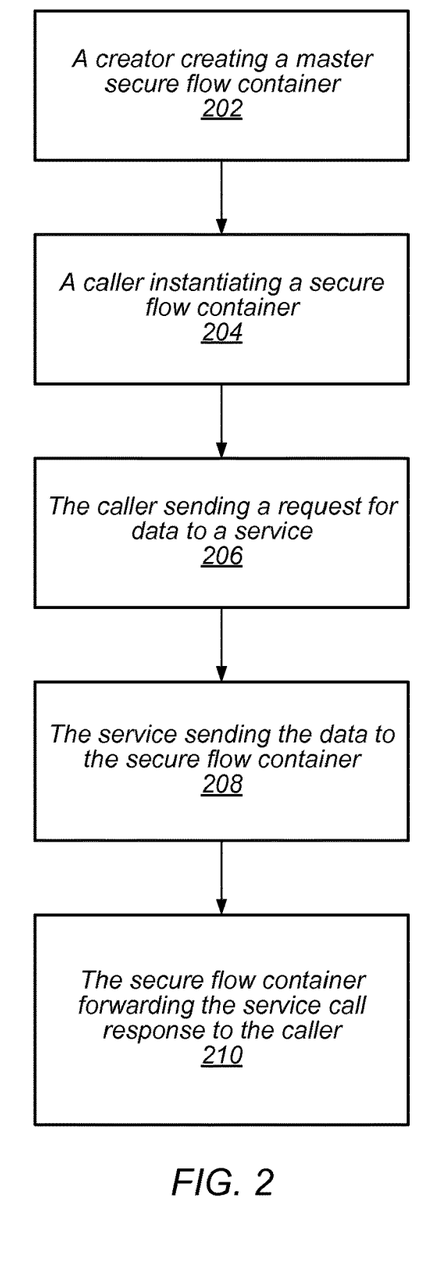
FIG. 2 illustrates example flow among the various components of a system for secure information flow enforcement.

An example implementation of secure information flow is shown in FIG. 2. As shown at 202, creator 118 may register SFC 114 for processing service call returns. Creator 118 may register SFC 114 by registering the launch configuration (of FIG. 1) with the system environment (e.g., monitors, virtual machine hypervisor, paravirtual operating system, etc.) to define the secure flow container. Creator 118 may provide SFC 114 with a creator permission set, the creator permission set being a subset of permissions held by the creator. Such permissions may indicate which entity or entities can write certain types of information. For example, a creator may be a computing device used by a representative of the finance department of a company. The creator may hold a large number of creator permissions with only some of them being relevant to the particular purpose for creating the SFC. In such an example, the creator may only provide the SFC with the relevant creator permissions.

As shown at 204, caller 102 may prepare SFC 114 for handling a specific service call. The caller may provide the SFC with a caller permission set (e.g., from FIG. 1). As was the case with the creator permission set, the caller permission set provided to the SFC may be a subset of the permissions held by the caller. As one example, the caller permissions may indicate who can write to the caller.

In one embodiment, the caller preparing the SFC may include the caller or system environment creating an instance of the SFC based, at least in part, on the launch configuration and provided permission sets (e.g., creator and/or caller permission sets). In such an embodiment, the registered SFC at 202 may be a master SFC and the SFC at 204, 208, and 210 may be a copy created by caller 102 (and/or service 108). The copy created by caller 102 may be a private copy that is used for the particular request for information and return of that requested information. The copy of the SFC may be available on demand (e.g., in the future when needed), may be registered as a call back intended to receive calls in the future, or it may be instantiated immediately upon making the request for information.

In one embodiment, to control which entity may instantiate an SFC, the caller may communicate with a system/management layer (e.g., the monitoring environment or some other system layer) that stores the launch configuration and/or master SFC, which may permit the caller to create the SFC. For example, the system layer may authenticate the caller as a valid entity that may create an SFC. Such an authentication may be specific to a particular piece of data, a particular service, a particular data store, etc.

At 206, caller 102 may send data to service 108, with the sent data representing a service call request. In one embodiment, the caller may construct a caller token (or comparable authorization data) for authorizing the service call. The token may authorize actions on behalf of the caller. The caller token may initially be obtained from an identity service and augmented by the caller granting one or more held permissions to the token. The token may also include a permission, held by the caller, which the caller 102 propagates to service 108. The token may have duration life (e.g., minutes, hours), such that once expiration passes, the service may no longer have that permission propagated by the caller. Service 108 may use the caller token to perform actions on behalf of the caller using at least some of the augmenting permissions. The service may perform actions on behalf of the caller additionally using service permissions held by the service. The service call request may include headers and/or other routing data indicating an address for the secure flow container to receive a response.

In some embodiments, as part of the service call, an indication of the return path (SFC) may be provided to service 108. The indication of the return path may be inferred (e.g., based on the ID of the caller, which service 108 can then look up the ID of the caller in a data store and find an associated SFC), may be part of a message header that explicitly includes a route to send the message to, and/or it may be statically configured (e.g., predefined ways for sending feedback via particular routes). In some embodiments, the location of the secure flow container may be determined based on a directory service request. In one embodiment, after receiving the request from caller 102, service 108 may know the route to use to send the requested data to caller 102 (via SFC 114).

As indicated at 208, service 108 may send data (e.g., retrieved from a data store such as data store 130) to SFC 114, with the sent data representing a service call response. The service call response may include headers or other routing data indicating that the response is a service call request. The secure flow container may use the routing data to direct the response back to caller 102.

In some embodiments, the requested data may be associated with a set of permissions that prohibit directly sending the response to the caller. The service may use the routing information from the caller to send data to the caller via the SFC. As noted herein, service 108 may send data to caller 102 via SFC 114. SFC 114 may be an existing copy of the SFC or it may be created on demand by service 108. For an on demand instantiation, service 108 may contact an on demand flow container host with information associated with the request. The on demand flow container host may use routing data and/or other data and either provide information to service 108 regarding an existing SFC instance to use, or it may create a new instance of an SFC.

In some embodiments, the caller preparing the SFC may include the caller creating a new integrity label for the SFC. The caller may include the new integrity label in the caller permission set and may augment the caller token with the new integrity label. The service may use the new integrity label granted by the caller token to gain permission to send data to the SFC. In this manner, the caller may bind the SFC to the service so that no party other than the intended service may send call returns using the SFC. Subsequent to the caller receiving the service call response, the caller may delete the new integrity label.

As shown at 210, SFC 114 may forward the service call response to caller 102 and the caller may read, write, propagate, and/or modify data from the service call response according to the various permissions held by caller 102. As described herein, the SFC may use a combination of permissions from the creator and/or caller in forwarding the response to caller 102. For example, the permission(s) from the caller may include permission to write back to the caller. The SFC may use the permissions and/or any tokens (e.g., caller token, service token) to declassify the information, and then send the declassified information and/or a pointer (e.g., for a large amount of data that may not be practical to transmit directly) to such information to the caller.

In some embodiments, the caller may lack permissions necessary to receive the service call response. For example, the service call response may include data classified with a label L for which the service is not an owner and for which the caller lacks permission. The creator providing the secure flow container with a creator permission set may provide the SFC with ownership for label L. The SFC forwarding the service call response may then use its permission to receive the classified data, declassify the data, and forward the data to the caller.

Figure 3:
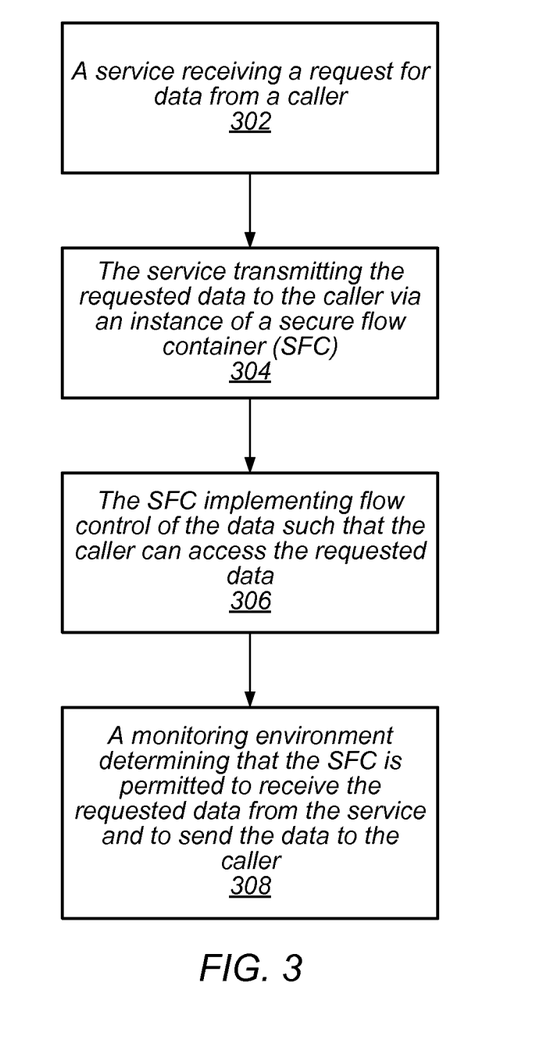
FIG. 3 illustrates a flowchart of an example method for secure information flow, according to some embodiments.

Turning now to FIG. 3, in various embodiments, system 100 may be configured to perform secure information flow according to a method for secure information flow, such as that of FIG. 3. While the method of FIG. 3 may be described as being performed by various components of system 100 (e.g., service 108, secure flow container 114, creator 118, etc.), the method need not be performed by any specific component in some cases. For instance, in some cases, the method of FIG. 3 may be performed by some other component or computer system, according to some embodiments. Or, in some cases, components of system 100 may be combined or exist in a different manner than that shown in the example of FIG. 1. In various embodiments, the method of FIG. 3 may be performed by one or more computers of a distributed computer system, one of which is shown as the computer system of FIG. 5. The method of FIG. 3 is shown as one example implementation of a method for secure information flow. In other implementations, the method of FIG. 3 may include additional or fewer blocks than are shown.

As shown at 302, a service may receive a request for data from a caller as part of a service call. In one embodiment, the received request for data may include receiving one or more permissions from the caller to permit the service to transmit the requested data.

As described herein, before the caller makes the request to the service, a creator may create a master secure flow container. The creator may be an administrator and/or owner of data that is requested at 302. The secure flow container created by the creator may be a master secure flow container based, at least in part, on a virtual environment specification from a data store (e.g., launch configuration 124). The master SFC may include specifications from which various instances of SFCs may be derived. In one embodiment, creation of the master secure flow container may also be based on one or more creator permissions from the creator.

In one embodiment, an instance of the SFC may be created, by the caller, upon the caller requesting data from the service. In other embodiments, an instance of the virtual return point/SFC may be created by the service after receiving the initial request for data from the caller.

In one embodiment, the instance of the secure flow container may receive one or more creator permissions. For example, the instance of the secure flow container may receive the creator permissions from the master secure flow container, which, in turn, received the creator permissions from the creator.

In various embodiments, as part of submitting the request for data, the caller may also provide, to the service, an indication of a return path through the SFC.

As illustrated at 304, the service may transmit the requested data (e.g., after retrieving it from a data store) to the caller via an instance of the secure flow container. Or, in one embodiment, the service may provide a pointer to the requested data (e.g., if it is not practical to transmit the data directly).

In one embodiment, the service may receive, from the caller, permission for an integrity label. The permission for the integrity label may be usable, by the service, to gain permission to provide the information to the secure flow container. The secure flow container may receive the integrity label from the caller and may use the integrity label to bind the secure flow container to the service component.

At 306, the secure flow container may implement flow control of the data. In one embodiment, implementing flow control may include providing the requested data to the caller such that the caller can access the requested data. In one embodiment, providing the requested data to the caller may be based on the one or more creator permissions.

In one embodiment, providing of the requested data may include declassifying the requested data. For example, in one embodiment, the caller may not have access (e.g., read) permission for the requested data. The secure flow container may use its permissions (e.g., creator and/or caller permissions) to declassify the requested data such that the caller can access the requested data. For example, declassifying the requested data may include using the creator permission set to permit the secure flow container to provide the requested data (or an indication of the location of the requested data) to the caller. As another example, declassifying the requested data may include transforming the requested data to remove an impermissible portion of the requested data.

In one embodiment, in addition to, or instead of providing the requested data directly to the caller, the SFC may provide a pointer to the caller so that the caller may then retrieve and/or read the requested data. For example, in one embodiment, it may not be practical to transmit the requested data directly to the SFC due to its size.

In one embodiment, the SFC may receive, from the caller, permission for an integrity label and use that permission to gain permission to provide the information to the call. The integrity label may be usable, by the caller, to bind the secure flow container to the caller.

As shown at 308, a monitoring environment may determine that the SFC is permitted to receive the requested data (or pointer to the data) from the service and that the SFC is permitted to send the requested data (or pointer to the data) to the caller. Note that other communications from the various components of system 100 may likewise be validated by the monitoring environment. Such validation/authorization may be performed by one or more virtual monitors, such as a virtual machine hypervisor and/or para-virtual operating system. As described herein, in one embodiment, one or more of the caller, service, and/or SFC may be implemented as virtual machines. In such an example, a respective virtual monitor corresponding to each one of the virtual machines may regulate ingress and egress traffic for the corresponding virtual machine. For instance, the virtual monitor corresponding to the virtual machine for the secure flow container may regulate ingress/egress traffic to/from the secure flow container.

In various embodiments, determining that the SFC is permitted to receive the data from the service and send the requested data to the caller may include intercepting those communications before the SFC is able to receive the information and before the SFC is able to send the information, determining that the communications are allowed based on one or more permissions (e.g., caller and/or creator permissions) of the SFC, permitting the allowed communications to occur and/or blocking the disallowed communications.

In various embodiments, the transmitting and providing of the requested data at blocks 306 and 308 may be based, at least in part, on permissions. Those permissions may be retrieved from a permission data store (e.g., permission data store 122) or may be received from elsewhere (e.g., from the caller, creator, etc.). The permissions may include permissions for respective entities regarding various pieces of data. For example, the permissions may indicate an identifier of data (e.g., data A), the owner of the data (e.g., the creator, or which creator if more than one), and permissions of the various entities (e.g., read for the caller, propagate/read for the service, and propagate for the SFC, etc.). Note that if an entity is not listed with respect to a particular piece of data, then that entity may have no permissions for that data.

In one embodiment, the caller may provide one or more permission sets to the service and SFC, respectively. Such permission set(s) may be used to augment the permissions from the permission data store. The one or more permission sets provided to the service and SFC may be the same one or more permission sets or different one(s). The permission sets may be usable to perform the providing and transmitting at blocks 306 and 308.

Figure 4:
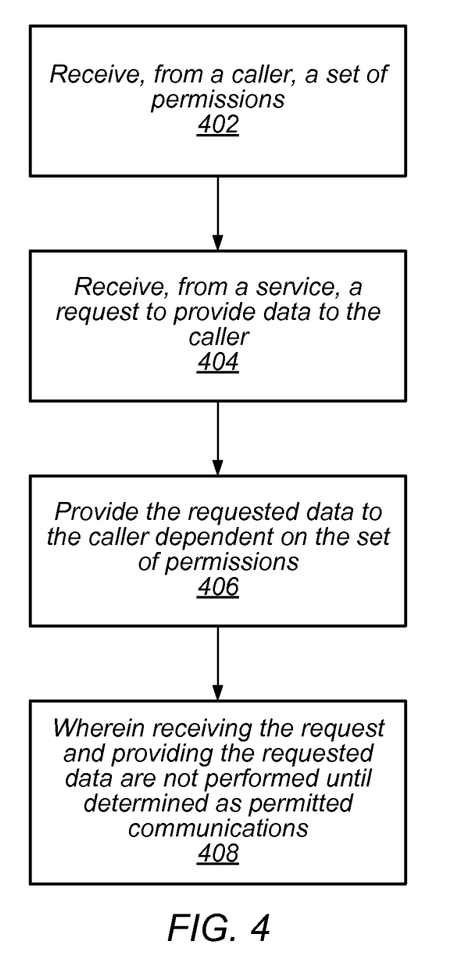
FIG. 4 illustrates a flowchart of an example method for secure information flow by a secure flow container, according to some embodiments.

Turning now to FIG. 4, one example of an SFC configured to perform secure information flow is shown. In various implementations, the method of FIG. 4 may include additional or fewer blocks than are shown. For example, some or all of the description of the method of FIG. 3 may likewise apply to the method of FIG. 4.

As shown at 402, an SFC may receive a set of permissions from a caller and/or a set of permissions from a creator. For example, the set of caller permissions may include permission for the SFC to write to the caller. In such an example, the SFC may not already possess such permission to write to the caller without receiving the supplemental permission at block 402. Note that the creator permissions may be received by the SFC indirectly from the creator. For example, the creator may set up a master SFC and provide the creator permissions to that master SFC. The SFC of block 402 may, in some embodiments, be an instantiation of an SFC and may receive the creator permissions from the master SFC and not directly from the creator.

At 404, the SFC may receive, from a service, a request to provide data to the caller. The request from the service may be generated in response to the service receiving an original request from a caller for the data. As part of the received request to provide the data to the caller from the service, the SFC may also receive the actual data to provide to the caller or a pointer to a location storing the data (e.g., if the data is determined to be too large to transmit).

As illustrated at 406, the requested data may be provided to the caller based, at least in part, on the received sets of permissions. For example, the set of caller permissions may permit the SFC to write to the caller. Providing the data to the caller at 406 may also be based on one or more other permissions, such as the SFC permissions from the permission data store.

In one embodiment, before providing the requested data to the caller, the SFC may declassify the requested data, as described herein.

As shown at 408, the receiving the request at 404 and providing the data at 406 may not be performed until determined as permitted communications, respectively (e.g., by a monitoring environment, such as a virtual machine hypervisor, etc.). For example, those communications may be intercepted by the monitoring environment and based on various permissions of the SFC, it may be determined if those communications are permitted. For example, if the SFC is not permitted to receive the request, then the data may not be provided to the caller. If the SFC is permitted to receive the request, then it may do so. Similar examples exist for a determination if the SFC is permitted to provide the requested data to the caller.

In various embodiments, the SFC may be specific to a set of data. The SFC may be time limited, limited to a set of callers and services, and/or to a specific set of data. Different SFCs may be instantiated and used for combinations of data, callers, and/or services other than the particular combination for which an SFC was instantiated.

Example Computer System

Various embodiments of the system and method for secure information flow, as described herein, may be executed on one or more computer systems, which may interact with various other devices. Note that any component, action, or functionality described above with respect to FIGS. 1-4 may be implemented on one or more computers configured as computer system 500 of FIG. 5, according to various embodiments. In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some cases, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

Figure 5:
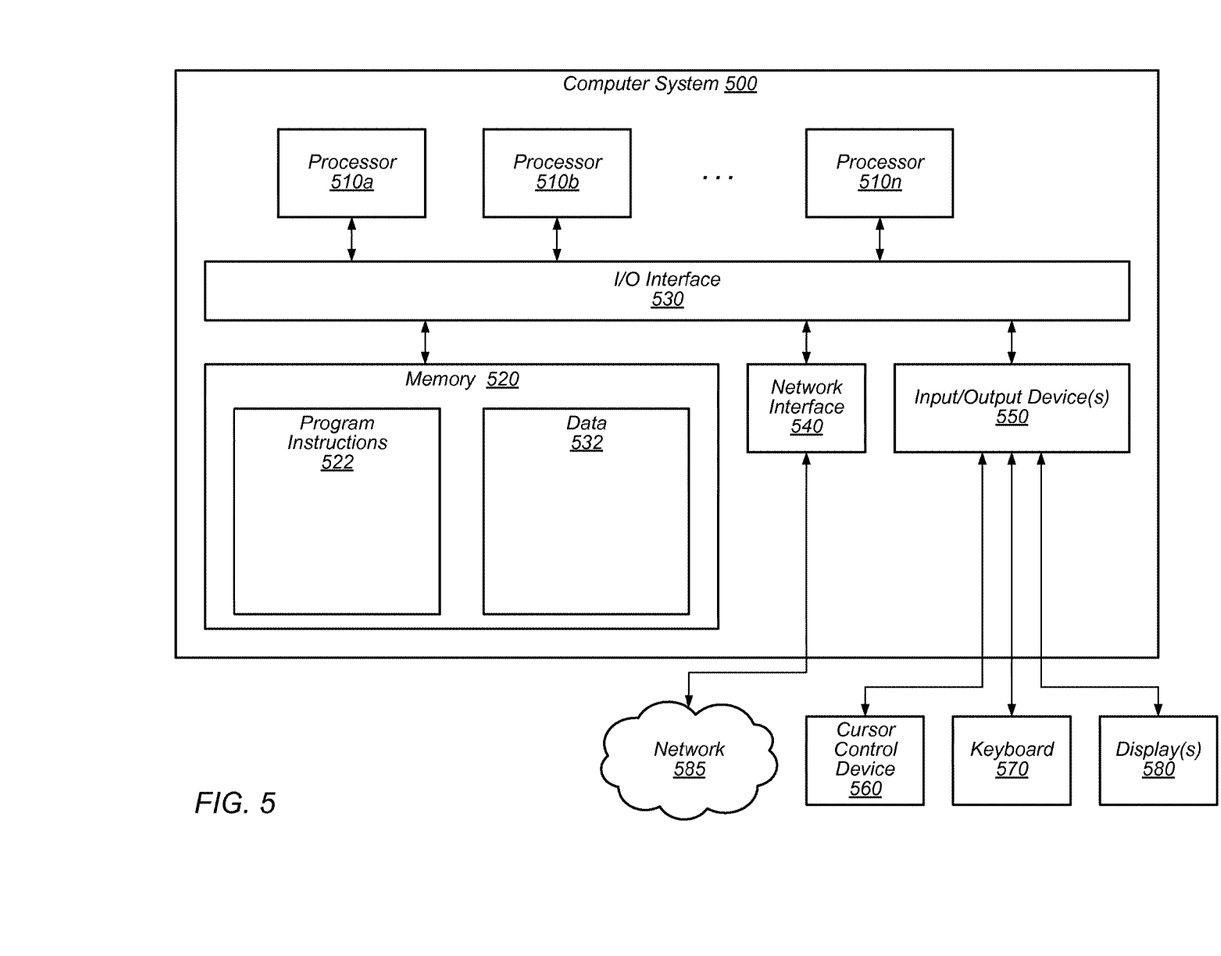
FIG. 5 illustrates one example of a computer system suitable for implementing various elements of secure information flow, according to some embodiments.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions 522 may be configured to implement any functionality of secure information flow system 100 described above. Additionally, data 532 of memory 520 may store any of the information or data structures described above. In some embodiments, program instructions and/or data may be received, sent or stored upon different types of computer-accessible media or on similar media separate from system memory 520 or computer system 500. While computer system 500 is described as implementing the functionality of functional blocks of previous Figures, any of the functionality described herein may be implemented via such a computer system.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network 585 or between nodes of computer system 500. Network 585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

As shown in FIG. 5, memory 520 may include program instructions 522, which may be processor-executable to implement any element or action described above. In one embodiment, the program instructions may implement the methods described above, such as the methods illustrated by FIG. 3. In other embodiments, different elements and data may be included. Note that data 532 may include any data or information described above.

Those skilled in the art will appreciate that computer system 500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A system comprising:
a service component implemented by one or more processors and memory and configured to:
receive, from a caller component, a service call request that includes one or more caller permissions; and
respond to the service call request, based at least in part on the one or more caller permissions, to provide information requested by the service call request to the caller component via a secure flow container, wherein the one or more caller permissions pertain to the requested information; and
a creator component implemented by one or more processors and memory to:
create a master secure flow container based at least in part on an environment specification from a data store; and
access configuration or permission data to create the secure flow container as an instance of the master secure flow container;
a monitoring environment implemented by one or more processors and memory and configured to:
determine if the secure flow container is permitted to receive the information provided by the service component;
permit the secure flow container to receive the information; and
determine, based at least in part on the one or more caller permissions, if the secure flow container is permitted to send the information to the caller;
wherein the secure flow container is:
implemented by one or more processors and memory distinct from one or more processors and memory that implement the caller component, and is configured to:
receive the information from the service component as permitted by the monitoring environment; and
send the information to the caller component as permitted by the monitoring environment.

2. The system of claim 1, wherein the caller component lacks permission to receive the information sent from the service component to the secure flow container, wherein the secure flow container is an instantiation of a master service flow container specified by a creator component, and wherein the secure flow container is further configured to:
based at least on a permission set from the creator component, forward the information received from the service component to the caller component.

3. The system of claim 1, wherein the service component is further configured to receive, from the caller component, permission for an integrity label, wherein the permission for the integrity label is usable by the service component to gain permission to provide the information to the secure flow container, and wherein the secure flow container is configured to receive, from the caller component, the integrity label, wherein the integrity label is usable by the secure flow container to bind the secure flow container to the service component.

4. The system of claim 1, wherein the secure flow container is further configured to receive, from the caller component, permission for an integrity label, wherein the permission for the integrity label is usable by the secure flow container to gain permission to provide the information to the caller component, and wherein the integrity label is usable by the caller to bind the secure flow container to the caller component.

5. The system of claim 1, further comprising:
a permission data store configured to store creator permissions that define associations between individual pieces of information and entities of the system, wherein the monitoring environment is configured to access the stored permissions for use in determining permission for the secure flow container to receive or send data.

6. The system of claim 5,
wherein the secure flow container is provided creator permissions from the creator component via the master secure flow container.

7. A method comprising:
performing, by one or more computers:
receiving, by a service, a request for data from a caller component;
creating, by a creator component, a master secure flow container based at least in part on an environment specification from a data store;
creating, based on configuration or permission data, a secure flow container, wherein the secure flow container is implemented by one or more hosts distinct from one or more hosts that implement the caller component, and wherein the secure flow container is an instance of the master secure flow container;
transmitting, by the service, the requested data to the secure flow container;
determining that the secure flow container is permitted to receive the requested data from the service;
in response to said determining that the secure flow container is permitted to receive the requested data, the secure flow container receiving the requested data from the service;
determining, based at least in part on one or more caller permissions, that the secure flow container is permitted to provide access to the requested data to the caller; and
in response to said determining, based at least in part on the one or more caller permissions, that the secure flow container is permitted to provide access to the requested data to the caller, the secure flow container providing access to the requested data to the caller.

8. The method of claim 7, wherein the caller lacks permission to receive a portion of the requested data, and wherein the method further comprises:
the secure flow container removing the portion from the requested data and sending the remaining requested data to the caller.

9. The method of claim 8, wherein said sending the remaining requested data to the caller includes receiving, from a creator, one or more creator permissions, wherein the one or more creator permissions are usable to permit the secure flow container to perform said providing the access to the requested data to the caller.

10. The method of claim 7, wherein the request for the data from the caller includes receiving a permission from the caller, and wherein the permission permits the service to perform said transmitting.

11. The method of claim 7, wherein the secure flow container instance is created upon said receiving the request, the caller sending the request, or the service transmitting the requested data.

12. The method of claim 7, further comprising:
receiving, by the service, a first permission set from the caller; and
receiving, by the secure flow container, a second permission set from the caller, wherein the first and second permission sets are usable to perform said transmitting and said providing, respectively.

13. The method of claim 7, wherein said transmitting and said providing are based at least in part on permissions retrieved from a permission data store, and wherein the permissions include permissions for respective entities regarding various pieces of data.

14. The method of claim 7, wherein said determining that the secure flow container is permitted to receive the requested data includes:
intercepting the transmitted requested data from the service to the secure flow container; and
based at least in part on one or more permissions, determining that the secure flow container is permitted to receive the requested data from the service.

15. The method of claim 7, wherein the received request includes an indication of a return path through the secure flow container.

16. The method of claim 7, wherein a location for the secure flow container is determined based on a directory service request.

17. The method of claim 7, wherein the secure flow container is implemented as a virtual machine, and wherein one or more monitors perform said determining and include a monitor corresponding to the virtual machine, wherein the monitor is configured to regulate ingress and egress traffic for the virtual machine.

18. A non-transitory, computer-readable storage medium storing program instructions, wherein the program instructions are computer-executable to implement:
a master secure flow container based at least in part on an environment specification from a data store; and
a secure flow container, derived based at least in part on the master secure follow container, the secure flow container configured to:
receive, from a caller component, a set of permissions, wherein the caller component is implemented by one or more hosts distinct from one or more hosts that implement the secure flow container;
receive, in response to a monitor intercepting and permitting a request from a service component to the secure flow container, the request from the service component to provide data to the caller component, wherein the set of permissions pertain to the requested data; and
provide, in response to the monitor intercepting and permitting a transmission from the service flow container to the caller and based at least in part on the received set of permissions, the requested data to the caller component.

19. The non-transitory computer-readable storage medium of claim 18, wherein the monitor permission is based at least in part on one or more permissions of the secure flow container, and wherein the set of caller permissions includes permission for the secure flow container to write to the caller component.

\* \* \* \* \*